April 6, 1971      K. ZIEGLER ET AL      3,574,138
CATALYSTS
Original Filed Nov. 15, 1954      4 Sheets—Sheet 1
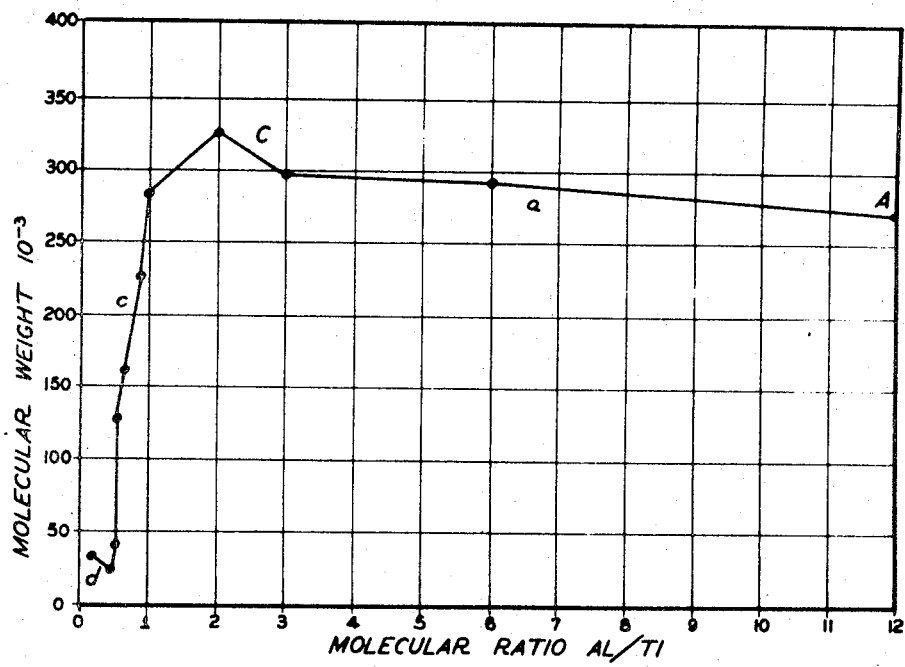
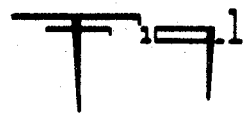
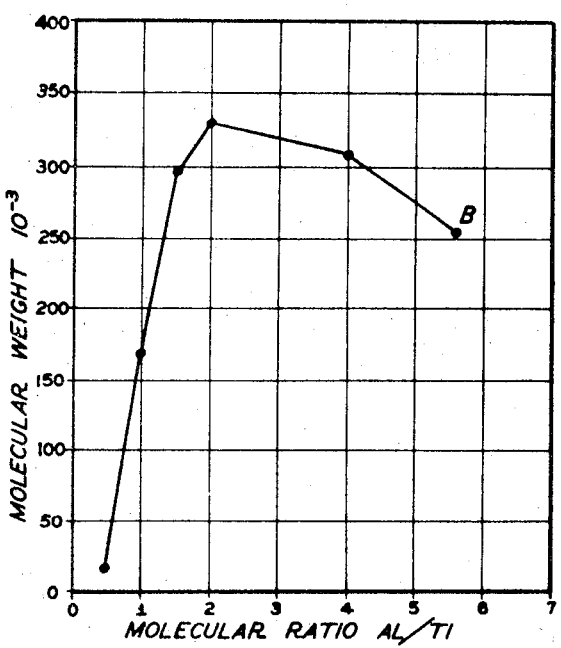
INVENTOR
KARL ZIEGLER
HEINZ BREIL
ERHARD HOLZKAMP
HEINZ MARTIN
BY *Burgess, Dinklage & Sprung*
ATTORNEY

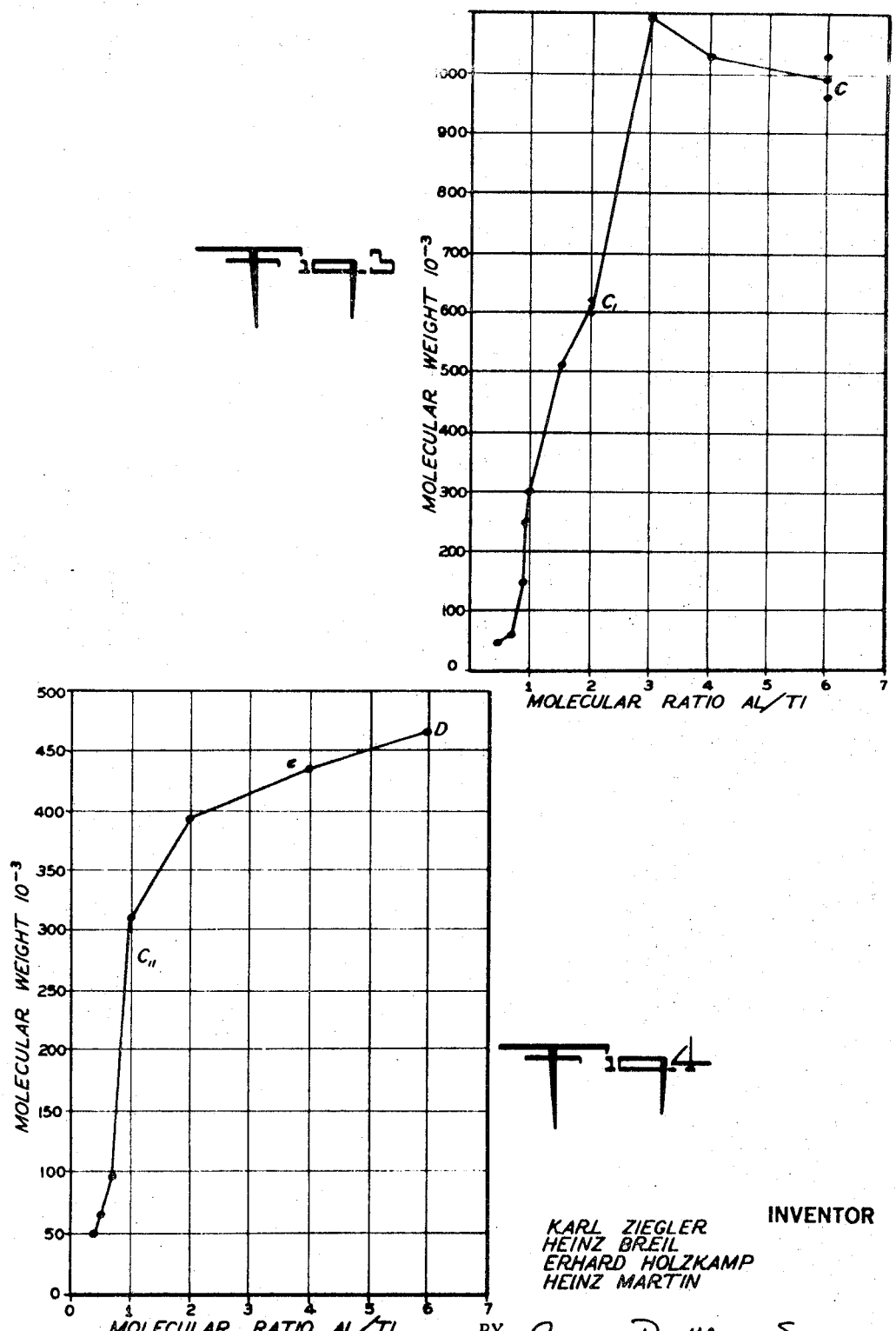

KARL ZIEGLER
HEINZ BREIL
ERHARD HOLZKAMP
HEINZ MARTIN

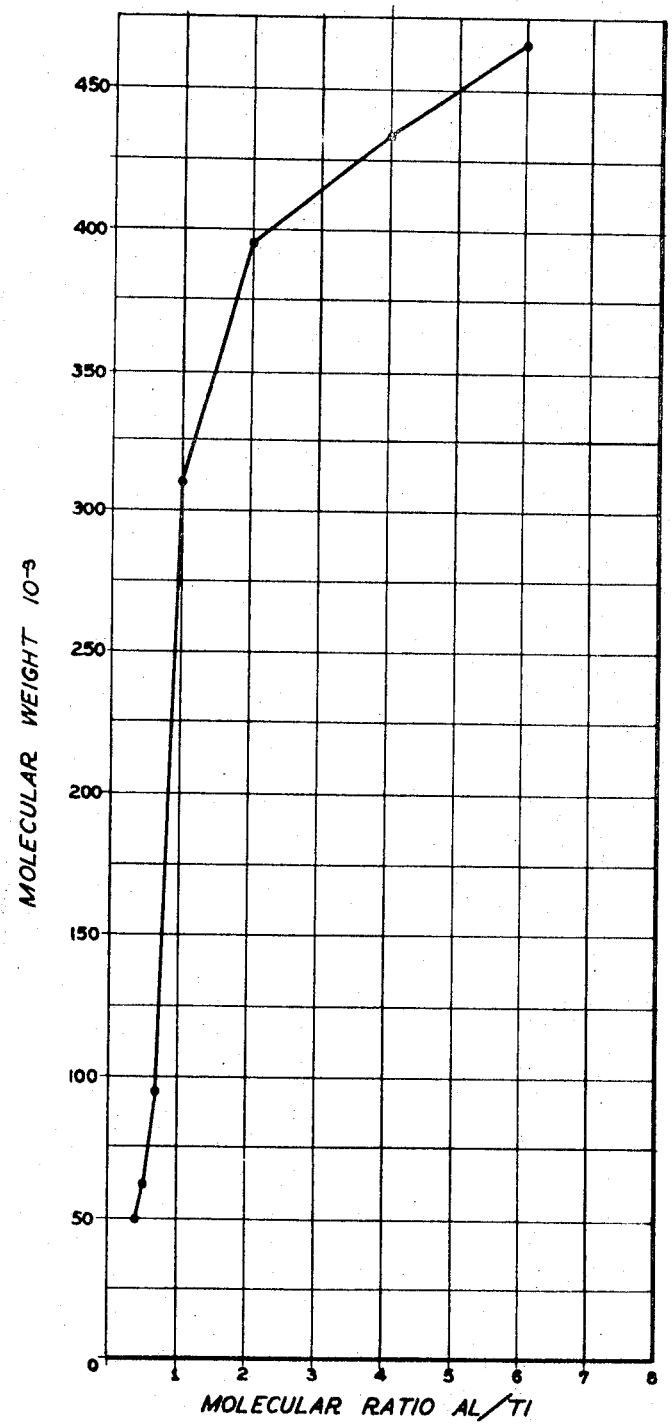

United States Patent Office 3,574,138
Patented Apr. 6, 1971

3,574,138
CATALYSTS
Karl Ziegler, Kaiser-Wilhelm-Platz 1, Mulheim (Ruhr), Germany, and Heinz Breil, Erhard Holzkamp, and Heinz Martin, Mulheim (Ruhr), Germany; said Breil, Holzkamp and Martin assignors to said Zeigler
Continuation of applications Ser. No. 469,059, Nov. 15, 1954, now Patent No. 3,257,332, Ser. No. 527,413, Aug. 9, 1955, now abandoned, and Ser. No. 554,631, Dec. 22, 1955, now abandoned. This application Nov. 26, 1957, Ser. No. 692,020
Claims priority, application Germany, Nov. 17, 1953, Z 3,799; Dec. 15, 1953, Z 3,862; Dec. 23, 1953, Z 3,882; June 10, 1954, Z 4,375; Dec. 27, 1954, Z 4,629
Int. Cl. B01j
U.S. Cl. 252—429                            23 Claims

ABSTRACT OF THE DISCLOSURE

Catalyst for polymerizing olefins such as ethylene and its homologues in the form of the product obtained upon mixing an aluminum triaryl or aralkyl with a salt, freshly precipitated oxide or hydroxide of a metal of Group IV-B, V-B or VI-B of the Periodic System, including thorium or uranium. Preferable salts are halides, such as titanium chloride or zirconium chloride.

Figure 5:
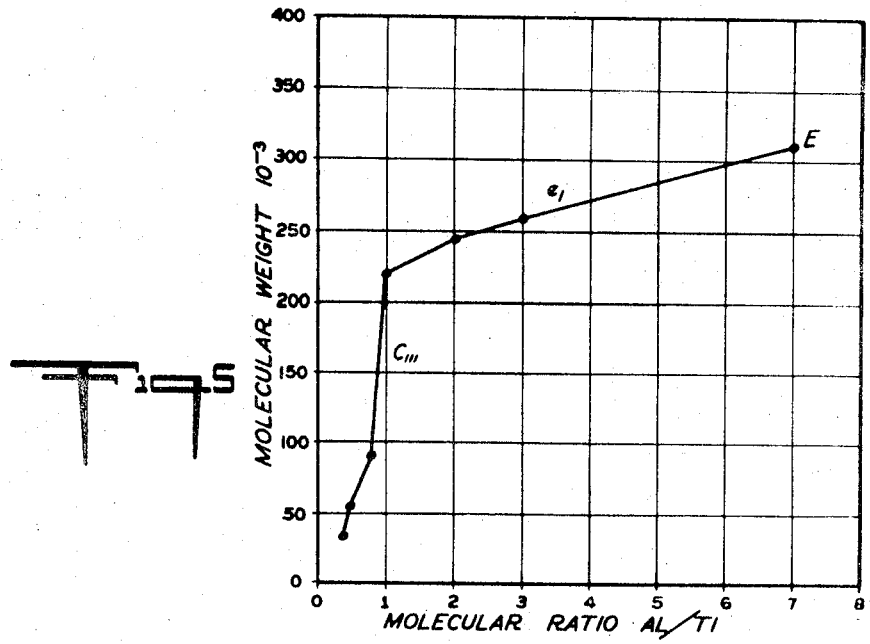
Figure 6:
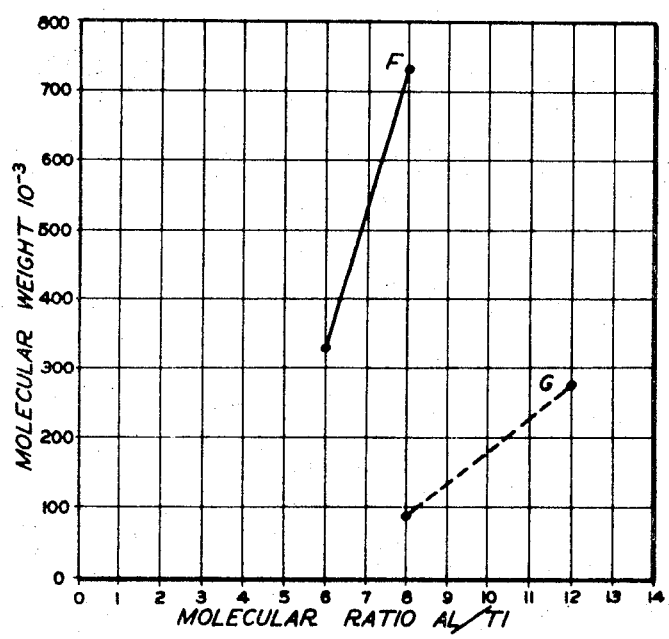

This invention relates to new and useful improvements in catalysts and is a continuation of copending applications Ser. No. 469,059 filed Nov. 15, 1954, now Patent No. 3,257,332, Ser. No. 527,413 filed Aug. 9, 1955 now abandoned and Ser. No. 554,631 filed Dec. 22, 1955 now abandoned.

The polymerization of olefins such as ethylene for the production of polymers ranging from gaseous through solid polymers is well known. When producing solid polymers such as for instance from gaseous ethylene, high pressures of, for example 1000 atmospheres and more were generally required and oxygen or peroxides were generally used as the polymerization catalyst. The yield obtained by these conventional methods were generally low with, for example, about 15–20% of the ethylene being converted in a single operation into the polyethylene and the highest polyethylene polymer which could be effectively obtained thereby had a molecular weight of about 50,000.

It has also been proposed to polymerize ethylenes using aluminum trialkyls as the polymerization catalyst. This polymerization reaction, however, is generally intended for producing low molecular polymers not ranging substantially above the liquid range. It has further been proposed to modify the polymerization using the aluminum trialkyl catalysts by the addition of auxiliary catalysts such as nickel or cobalt. In this connection, there are obtained low molecular polymerization products, such as a butene-1.

Higher molecular polymers may also be obtained from olefins such as ethylene using an aluminum trialkyl catalyst by selecting a suitable quantity ratio of the aluminum trialkyl to the ethylene. It is, however, very difficult to obtain a polymer such as polyethylene of a molecular weight higher than a few thousand and it is necessary to use a very small quantity of the aluminum trialkyl as, for example, aluminum triethyl for the production of higher molecular products. With the use of such small quantities of the aluminum trialkyl, however, the reaction becomes very sensitive to traces of impurity in the ethylene and proceeds very slowly, since the quantity of catalyst in the total reaction mixture is very small.

One object of this invention is a new catalyst for obtaining high molecular weight products which may be used as plastics.

A further object of this invention is a new catalyst for the polymerization of ethylene into high molecular polyethylenes with a higher yield than heretofore obtainable.

A still further object of the invention is a new polymerization catalyst for obtaining polymers having molecular weights higher than those heretofore obtainable.

These and still further objects will become apparent from the following description:

The catalyst in accordance with the invention is formed by mixing at least one Al-tri-hydrocarbon, i.e., Al-alkyls, -aryls and mixed -alkyl-aryl, and preferably at least one member of the group consisting of Al-trialkyls, Al-triaryls, Al-triarylalkyls, Al-trialkylaryls and Al-tri-hydrocarbons having mixed alkyl, aryl, aralkyl and alkylaryl substituents with a compound of heavy metal of Group IV–B, V–B, or VI–B of the periodic system of elements, including thorium and uranium, said compound being selected from the group consisting of the salts and the freshly precipitated oxides and hydroxides of said metals.

The designation Al-aryl or similar expression as used herein generically is intended to include as is well understood in the art an organic Al compound having one or more aryl, aralkyl or alkylaryl substituents.

Except as otherwise limited herein, the term "salt" or "salts," designating a compound having a heavy metal of the IV–B, V–B and VI–B groups of the periodic system, including thorium and uranium, is employed in its broadest sense i.e. to connote the reaction product between a base and an acid, including products of the type of acetyl-acetonates and further including salts in which said periodic system group member is present as a cation as well as those in which such member is present as an anion such as in products of the type of titanates, zirconates, chromates, molybdates or tungstates. The term "pure alcoholates" hereafter designated "salts," is intended to connote "salts" having solely alcoholate radicals attached to said heavy metal. Mixed "alcoholates" of said heavy metals as hereafter referred to are such salts having at least one alcoholate radical and at least one nonalcoholate radical.

Particularly good results are produced with heavy metal compounds which are soluble in inert organic solvents such as hydrocarbons.

The term "high molecular" as used herein is intended to designate molecular weights of more than 2,000, and preferably more than 10,000.

The herein designated numerical values for molecular weights are based, in accordance with conventional practice, on the viscosity of the solutions of the polyethylene for which the molecular weight determination is to be made. This viscosity is expressed as "intrinsic viscosity" ($\eta$) which is to be calculated on the basis of an equation given by Schulz and Blaschke (Journal fur Praktische Chemie, volume 158 (1941) pp. 130–135, Equation 5 B.P. 132) and corrected for the therein mentioned specific viscosity according to Fox (Fox and Flory J. Am. Soc. 73 (1951) p. 1901). The average molecular weight, as for instance that of 50,000 above given, is calculated from such intrinsic viscosity by way of the modified equation of R. Houwink (Journal fur Praktische Chemie, new Edition, 1957 (1940) pp. 15–16 Equation 5):

$$MW = K \times (\eta)^a$$

for which the constant $K=2.51\times10^4$ and the constant $a=1.235$ for the new plastics is intended. On the basis of molecular weights calculated in this manner, polyethylenes having molecular weights of 300,000 up to 3,000,000 and more may be obtained in accordance with the invention.

In general the Al-tri-hydrocarbon is preferably one in which the substituents possesses from 0 to one and more aromatic hydrocarbon rings of from $C_6$ to $C_{10}$ i.e. the benzene and naphthalene rings.

The aluminum trialkyl compounds which may be used in forming the catalysts in accordance with the invention may be any conventional or known aluminum trialkyl as, for example, aluminum trimethyl, aluminium triethyl, aluminum tripropyl, aluminum triisobutyl, or higher aluminum trialkyls (especially in in excess of $C_5$). Convenient higher Al-trialkyls are for instance those within the range of average composition of about $C_8$ to $C_{12}$ such as an average composition of aluminum trioctyl or tridodecyl or their mixtures. The higher trialkyls are without limitation to the number of carbon atoms. Examples of Al-aryls which may be employed are: aluminum triphenyl, -tritolyl, -trixylyl and -trinaphthyl and include such aralkyls (the Al is linked to the aliphatic chain) as aluminum benzyl or aluminum phenyl ethyl. Mixed Al alkyls and -aryls useful in accordance with the invention are compounds in which the Al is linked both to alkyl residues, for example methyl or ethyl, and also to aryl residues or aralkyl residues, for example phenyl or benzyl.

The compounds of the metals which are mixed with the aluminum tri-hydrocarbon to form the catalyst may be any compound of a metal on the left hand side of the IVth to VIth Groups of the Periodic System, including thorium and uranium. In certain of the newer Periodic Charts of the Elements, these metals on the left hand side of the IVth to VIth Groups of the Periodic System are designated as Groups IV–B, V–B, and VI–B respectively. The term "heavy metal" is used herein in contrast with the relatively lighter metal aluminum. When reference is made herein and in the claims to metals of Groups IV–B, V–B and VI–B of the Periodic System, there is intended any member of these groups, including thorium and uranium, as for example, titanium zirconium, hafnium, thorium, uranium, vanadium, niobium (columbium), tantalum, chromium, molybednum and tungsten. Any compound of these metals such as the halogenides, for example chlorides or bromides, oxyhalogenides, for example oxychlorides, complex halogenides, for example, complex fluorides, freshly precipitated oxides or hydroxides or organic compounds, for examples pure alcoholates of the type of esters such as titanium-, zirconium- etc. tetra butyl esters, mixed alcoholates, acetates benzoates or acetyl acetonates and similar compounds may be used. Also mixed compounds, as for example of the type of mono-, di- or tri- halogene (preferably chloro-) alcoholates of said heavy metals may be used. Salts of titanium, zirconium, uranium, thorium and chromium have been found to be preferable.

A particularly active catalyst in accordance with the invention may be obtained, for example, by mixing a titanium or zirconium compound, such as a tetrachloride, oxychloride, or acetyl acetonate with the aluminum tri-hydrocarbon.

The exact nature of the catalyst produced by the mixing of the metal compound of Group IV–B to VI–B and the aluminum tri-hydrocarbon is not known. It is believed that the heavy metal compound is converted to a lower valency form. Thus, for example, upon bringing together the tetravalent zirconium compound and the aluminum trialkyl, there is formed a compound of monovalent, bivalent or trivalent zirconium. The fact that the quadrivalent zirconium salt undergoes a conversion may be clearly noted from the fact that the initially colorless salt dissolves in the aluminum trialkyl, becoming darker in color and generating heat. While the special polymerizing action of the catalyst in accordance with the invention may come from the combination with the aluminum tri-hydrocarbon, probably the low valence group IV–B, V–B, or VI–B metal compound has a high polymerization effect by itself, since for example the action of the Al-trialkyl derived catalyst on ethylene starts at a lower temperature and takes place more rapidly than the normal reaction of aluminum trialkyl with ethylene.

Within the broadest concept of the invention the ratio of Al-tri-hydrocarbon to heavy metal compound is not critical with respect to the obtaining per se of high molecular polymers such as exemplified by polyethylenes with molecular weights from 10,000 to 3,600,000 and higher. Expressed in mol ratios they may run from fractions, as for example 0.1, or even less, to multiples of 1, such as 12 or higher, of $$\frac{\text{Al-tri-hydrocarbon}}{\text{heavy metal compound}}$$

In the event that the heavy metal compound is a true alcoholate, it is preferable to utilize a mol ratio of $$\frac{\text{Al-tri-hydrocarbon}}{\text{heavy metal compound}}$$

of a least about 10:1 since such alcoholates will also produce dimers and the dimerization is increasingly suppressed with increasing mol ratios.

Whenever the primary objective is to assure that particulary high molecular weights are secured for the polymer produced by use of the catalyst in accordance with the invention, or, when oxydizing impurities, as for example moisture or oxygen, are present, such as in ethylene, or in any solvent, it is preferred to utilize an excess of Al-tri-hydrocarbon. In that case it is of advantage to use at least 2 mols of the Al-tri-hydrocarbon for each mol of heavy metal compound regardless of its valence and preferably, in the case of heavy metal compounds other than acetyl acetonates, $2n$ to $3n$ mols of the aluminum compound to every mol of the heavy metal compound "$n$" being the valence of the heavy metal.

A typical illustration of such mol ratios is for instance a combination composed of one mol of a tetravalent titanium salt such as $TiCl_4$ and 8–12 mols of Al-trialkyl. The reasons for the desirability of an excess of Al-compound, in the event of for example the presence of oxydizing impurities, are based on the following considerations:

When the aluminum tri-hydrocarbon sets for instance on the tetravalent titanium salt, a reduction takes place which, however, does not reduce the titanium to metallic titanium. If the aluminum tri-hydrocarbon reacts at first only with one of its hydrocarbon radicals such as an alkyl, as for instance an ethyl group as is true in general for the reactivity of these organic aluminum compounds, not more than three molecules of aluminum tri-hydrocarbon will presumably be consumed in the reduction of the tetravalent titanium salt. An excess of hydrocarbon radical component beyond that serving for preparing the catalytically effective material is then normally present when using the above referred to multiple mol amounts specified for heavy metal compound combinations other than acetylacetonates. The excess of aluminum tri-hydrocarbons is of value to counteract the oxidizing action of impurities frequently present when ultilizing the catalyst. Thus in ethylene there may be present, for example, moisture or oxygen which oxidize the air sensitive catalysts and thus impair their activity. The excess of the aluminum tri-hydrocarbon prevents this oxidation or reduces the already oxidized catalyst to eliminate impurities possibly present in the ethylene.

In the practical application of the catalyst in accordance with the invention, polymerization is effected by contacting the material to be polymerized, such as for instance ethylene, with the catalysts. The minimum quantities of the catalysts in relation to for example olefine such as ethylene may vary within very wide limits and are dependent upon the purity of the material to be polymerized. When using for instance very pure ethylene, 0.1 part of catalyst to 1.000 part of ethylene will already be sufficient. It is evident that larger quantities can be used even in the case of pure ethylene. However, it is desirable to avoid using unnecessarily large quantities of catalyst so as not to make the working up process more difficult than is necessary. Taking very impure ethylene good results can nevertheless be obtained with quantities of catalysts amounting to only a few percent. If solvents are used for the polymerization, the same applies in connection with the purity of the solvents. The quantities of catalysts employed influence the molecular weight of the polymers produced so that the degree of polymerization and thus the molecular weight will be higher the smaller the quantity of catalysts employed. On the other hand the higher the catalyst concentration the lower will be the molecular weight.

The influencing of the molecular weight however by altering the concentration of the catalyst, has its limitations, in that an increase in the catalyst concentration leads to an increased consumption of catalyst and this makes the process more expensive. In addition, the polymers obtained with high catalyst concentrations contain more ash than those made with low catalyst concentrations and must have this ash removed therefrom by complicated lixiviation or washing with solvents. On the other hand, when the catalyst concentration is considerably reduced for the purpose of raising the molecular weight, the reaction velocity of the polymerization is appreciably reduced and consequently also the yield per unit of volume and time. Moreover, the control of molecular weight by variation of catalyst concentration cannot readily be applied to the range of molecular weights below 100,000, which is a particularly important range in practice.

Within the scope of one embodiment of the instant invention it is possible to obtain for the polymers, variations in molecular weight in a manner avoiding or at least appreciably minimizing some or all of the disadvantages entailed by variation in catalyst concentration and to secure benefits not obtainable by the latter method. This embodiment is based on the discovery that for catalyst combinations, usable in accordance with the invention, variations in mol ratios of $$\frac{\text{Al-tri-hydrocarbons}}{\text{heavy metal compound}}$$

will produce different molecular weight polymers. Broadly speaking, lower mol ratios will yield lower molecular weight products and higher mol ratios will give higher molecular weight products. It is thus possible for any given catalyst combination to obtain for instance polyethylenes of predetermined molecular weights by selecting specific predetermined mol ratios for that combination.

The mol ratio variation effect is in each case readily ascertainable from the curve or graph obtained when plotting different mol ratios of given catalyst combinations, useful in accordance with the invention, against the respective molecular weights of the polymers obtained by the use of these given combinations. Such curves or graphs are for instance illustrated in the accompanying drawings by way of FIGS. 1–7. They show the easy securability of any desired molecular weight by selecting the appropriate mol ratio.

It has been further found that each $$\frac{\text{Al-tri-hydrocarbons}}{\text{heavy metal compound}}$$

mol ratio versus molecular weight curve for any given catalyst combination, useful in accordance with the invention, possesses a relatively "steep" (including) portion for which the pitch is greater than the pitch of other portions of the same curve. In many cases the "steep" portion of the curve is additionally characterized by the fact that its pitch corresponds to a greater change in molecular weight for each increase of one mol ratio or less than any section of any other and particularly succeeding curve portion inclining in the direction of increasing mol ratios.

As will be seen in accordance with the foregoing and the more specific exemplification by the illustrated graphs hereafter more fully discussed, the "steep" portion of the mol ratio versus molecular weight curve defines for relatively small increments in mol ratio relatively large increments in molecular weight.

The curve portions adjacent the "steep" portion, i.e. those immediately following and those immediately preceeding the above identified "steep" portion of the graph, defining mol ratio versus molecular weight, in accordance with the invention, may also show the relatively small changes in mol ratio relatively large variations in molecular weight. Whereas the "steep" curve portions normally show molecular weight increases with rising mol ratios of catalyst, the "adjacent" curve portions, may comprise a portion or may be composed of sections in which increments in mol ratios produce decreases in molecular weights. Though the "preceeding" curve portion may exhibit a lesser change in molecular weight than is the case for the curve portion succeeding the "steep" portion, the former may offer nevertheless appreciable advantages. Thus, such "preceeding" curve portion within the range of molecular weights, controlled thereby permits the selection of mol ratios requiring a comparatively small amount of the relatively expensive, and in higher concentration more difficult to handle aluminum trihydrocarbon. Within the preferred scope of this embodiment of the invention there are included the "steep" portion of the mol ratio versus molecular weight curve as well as its adjacent lower and upper curve portions showing for relatively small changes in mol ratios relatively large changes in molecular weight. This preferred range is designated in accordance with the invention as the "sensitive range." If the primary consideration is to accomplish savings in aluminum tri-hydrocarbon material it is of advantage to select that portion, and preferably initial portion, of the mol ratio versus molecular weight curve which in the direction of increasing mol ratios ends (as part thereof) with the relatively "steep" (inclining) portion thereof. Because of the obvious advantages, however, offered by the steeply pitched portion of the curve or graph, the preferred range of the mol ratio versus molecular weight curve is normally represented by the "steep" portion thereof as hereinabove defined.

Inasmuch as increasing mol ratios mean relative decrease in heavy metal compounds which may be in some cases more expensive than some of the more readily available aluminum-tri-hydrocarbons, the sensitive range also permits the determination for selection of a desired molecular weight with the least amount of heavy metal compounds. Further the sensitive range permits in all cases the determination of the highest molecular weight at the most economical mol ratio of materials. Above all, however, the sensitive range and especially the "steep" curve portion thereof permits the obtaining of any desired predetermined molecular weight furnishing therefor predeterminately fixed ratio of catalyst components within a relatively narrow range of adjustment to cover a very wide and in many cases, the entire molecular weight range obtainable for a particular catalyst and condition of polymeriztion.

An exemplification of the sensitive range of different mol ratios for a specific catalyst combination is for instance furnished by Table I and curve A (FIG. 1). The combination is that of $Al(C_8H_{17})_3$ and $TiCl_4$ and Table I sets out the results of a number of ethylene polymerization experiments with the aluminum trioctyl and titanium tetrachloride system using different mol ratios. These experiments and the experiments represented by the other tables were carried out as follows:

The amount of aluminum tri-hydrocarbon necessary for each experiment was initially dissolved in 250 cc. of diesel oil distilled with sodium and having a boiling point of 180–240° C., the said oil being produced by carbon monoxide hydrogenation according to Fischer-Tropsch. In all cases the same amount of heavy metal compound, such as for titanium tetrachloride, 4.75 g. thereof, were then added dropwise at room temperatures while stirring. In addition, 2.25 liters of the said diesel oil were saturated with ethylene in a closed stirrer-type apparatus filled wth nitrogen and then the catalyst solution was caused to run in. If the heavy metal compound does not readily lend itself to dropwise addition, or where it is otherwise desirable, the same may be added in an organic solvent and preferably a hydrocarbon such as said diesel oil solution. In that event the amount of solvent in such solution is to be calculated as part of the specified total solvent, i.e., specifically as part of the total 2500 cc. diesel oil used.

By starting, for example, with 12 mols of aluminum compound per mol of titanium tetrachloride (Table I) and (FIG. 1) and then reducing in stages the amount of organic aluminum compound used while keeping the amount of titanium tetrachloride constant, the influence of this step on the molecular weight of the polymers obtained is initially slight (section $a$, curve A). Only a relatively slight increase in the average molecular weight of the polyethylene occurs up to a ratio of about 3:1. Thence to a ratio of 2:1, the molecular weight again increases somewhat more strongly to the region of 320,000 under the conditions set out above (section $b$, curve A). A "steep" range then follows (section $c$, curve A) in which extraordinarily small changes in the ratios exert quite an appreciable influence on the molecular weight of the polymers obtained. If the ratio of 2 Al:1 Ti is initially used and if the ratio is changed to 1:1 to 0.5:1, this causes a drop in the molecular weight from 320,000 to 20,000, so that it is possible to obtain any desired molecular weight between about 20,000 and 320,000 by a fine adjustment of the ratio between the organic aluminum compound and the titanium tetrachloride within this range $c$ of curve A.

The figures indicated in Table I only apply for the experimental conditions which have been set forth, since there are, as already mentioned, other factors which influence the molecular weight of the polymer. Depending on these other conditions, the polymerization curves may plot differently and the starting point of the "steep" ranges may be shifted to different levels. This is particularly pronounced when using a high molecular ratio between an aluminum trialkyl and titanium tetrachloride. For any given set of polymerization conditions and catalyst combination, however, if the molecular ratio of aluminum tri-hydrocarbon to heavy metal compound is reduced, a range such as the sensitive range $b+c+d$ of curve A exists in which further changes in molecular ratio permit an extraordinarily sensitive regulation within a relatively wide range of any desired predetermined molecular weight of the polyethylene. This is particularly true of range $c$. In certain cases the entire "sensitive" range may be essentially composed of the "steep" portion of the curve such as section $c$ of curve A.

As will be seen from Table I and curve A (FIG. 1), the limits of the sensitive range in which the molecular weight of the polyethylene changes considerably with a relatively small change in molecular ratio are 0.2:1 and 3:1 and preferably 2:1. Any section of curve A defined by the curve portion between 0.2 and 2.0 mol ratios, including that between 0.2 and 0.5, corresponds to a greater molecular weight change per 0.3 mol ratios than any section following 2.0. The limits are different with other combinations.

The essential feature of this "sensitive range" embodiment of the present invention does not consist so much in determining the accurate numerical limits of these sensitive ranges or the preferred "steep" portion thereof for each conceivable combination, as in the fundamental discovery that there is in fact such a sensitive range or "steep" portion. The position or scope of this range can be determined easily for any given combination by a small series of experiments and plotting the results of the experiments by means of curves. The values given in Table I and the other tables are those selected from a larger number of intermediate values and define the section termini of the corresponding curves.

TABLE I

| No. of experiment | Molecular ratio Al(C$_6$H$_{17}$)$_3$: TiCl$_4$ | Colour of catalyst | Yield after 4 hours of reaction, g. of polyethylene | $(\eta)$ dl./g. | Average molecular weight of polyethylene |
|---|---|---|---|---|---|
| 1 | 12 | Black | 440 | 6.9 | 272,000 |
| 2 | 6 | do | 430 | 7.3 | 292,000 |
| 3 | 3 | do | 460 | 7.45 | 298,000 |
| 4 | 2 | Blackish-brown | 530 | 7.9 | 322,000 |
| 5 | 1 | Reddish-brown | 440 | 7.15 | 284,000 |
| 6 | 0.83 | do | 450 | 5.95 | 226,000 |
| 7 | 0.63 | do | 430 | 4.5 | 160,000 |
| 8 | 0.59 | do | 440 | 3.75 | 127,000 |
| 9 | 0.53 | do | 460 | 1.46 | 40,000 |
| 10 | 0.50 | do | 300 | 0.87 | 21,000 |
| 11 | 0.20 | do | 10 | 1.19 | 31,000 |

For molecular ratio values higher than the top of the steep portion of the sensitive range, as exemplified on curve A by the 2:1 ratio, the molecular weight of the poly-ethylene is not appreciably altered. If the molecular ratio values are lower than the starting point of the sensitive ranges, i.e., on curve A beyond 0.2:1, this also has no great influence on the molecular weight of the polyethylene which is formed. However, the volume-time yield is considerably reduced and soon a zone is reached in which it is no longer possible for the polyethylene to be produced economically with low ethylene pressures. This can to a large extent be counteracted by raising the ethylene pressure. However, particular technical advantages do not result from such a process.

Polymerization with the catalysts in accordance with the broad and generic scope of the invention is effected by merely contacting the material to be polymerized such as gaseous ethylene with the above described catalyst. This may be carried out under reaction conditions generally considered and conventionally termed in the art as "mild" reaction condition (as to temperature and pressure). The contacting may be effected at normal or up to about 10 atmospheres pressure or at comparatively low pressures of about 10–100 atmospheres; the contacting pressure is not critical and a smooth polymerization may be effected at atmospheric or subatmospheric pressures. On the other hand, the action of the new catalyst remains fundamentally unchanged, even if the pressure is increased to any desired obtainable value. It is advantageous to work at pressures of 1 to 10 atmospheres. It is an outstanding advantages of the invention that one may operate at ordinary atmospheric pressure with excellent results.

Previously known high pressure ethylene polymerization processes have the further disadvantage that ordinarily only a relatively small proportion of approximately 15 to 20% of the ethylene introduced is converted into polyethylene. On the other head, ethylene treated with a catalyst in accordance with the invention is predominantly converted. Moreover, the ethylene to be employed with the catalyst of the invention need not be so pure as in the known high pressure processes.

The temperature of the contacting is not critical and the same may be effected at room temperature or below. It is advantageous to operate at somewhat elevated tempeartures and particularly above about 50° C. Thus in ethylene polymerization, as contrasted to prior art processes, the ethylene contacted with a catalyst in accordance with the invention may be rapidly converted into high molecular polyethylene even at low pressures of less than 100 atmospheres and temperatures of less than 100° C. Working at temperatures above 250° C. is not advisable because at this temperature the catalysts may decompose to a considerable extent.

Further, the catalysts in accordance with the invention, may be contacted with gas mixtures. Thus instead of pure ethylene, ethylene-containing gas mixtures may be directly used for the polymerization, for example, gases which are generated during the cracking of saturated hydrocarbons, such as ethane or propane, or from mineral oil or its fractions, or generated during similarly conducted Fischer-Tropsch synthesis, and if desired freed from other olefins.

The activity of the catalyst and the degree of polymerization of the final substances obtained are dependent upon the metal compounds selected, the manner of its preparation and the ratio of the quantity of the heavy metal compound to the quantity of the aluminum trihydrocarbon, he latter determining largely the degree of polymerization as above set forth.

Thus, it has been found that, when using sufficient quantities of the Group IV–B to V–B metal-containing components of the catalyst, titanium-containing catalysts are more active than zirconium-containing catalysts. The activity of the catalyst can be further substantially increased by using for the preparation, instead of a relatively low molecular aluminum tri-hydrocarbon one having larger hydrocarbon radicals. This is particularly true for Al-tri-alkylis from which higher alkyls may be advantageously obtained, for example, from aluminum triethyl by combination with ethylene. It is in many cases preferred to operate in the presence of solvents. Suitable solvents are: aliphatic and hydroaromatic hydrocarbons, such as pentane, hexane, cyclohexane, tetrahydronaphthalene, decahydro-naphthalene; higher paraffins, also in mixtures; paraffins liquid at the reaction temperature; aromatic hydrocarbons, such as benzol, xylol; halogenated aromatic hydrocarbons, such as o-dichloro-benzol, chlorinated naphthalene; others such as dibutyl-ether, dioxane, tetrahydrofurane. These solvents are used in such quantities that it is still possible to stir the reaction mixture even when it is nearing the end of the reaction. Generally this stirring operation is possible even when the reaction mixture as in the case of ethylene, contains 10 to 40% polyethylene at the end of the reaction. Maximum limits only exist as regards the economy of the process.

The preparation of one form of catalysts, useable in accordance with the invention, by the use of solutions of at least one component, such as the al-tri-hydrocarbon is for instance exemplified when titanium tetrachloride is introduced, drop by drop, into a hexane solution of aluminum triethyl such as in a molar ratio of 1:8, the solution assumes a dark color and a difficultly soluble black precipitate deposits, which contains aluminum and titanium. This difficultly soluble compound, the exact structure of which is not known, is believed to be the true polymerization exciter. With suspension of this precipitate in a solvent such as hexane, ethylene can be readily polymerized, even at normal pressure. The hexane assumes a deep color and contains the same compound apparently in a colloidally dispersed state. The amount of precipitate which remains colloidally suspended and the amount which separates out vary with the manner in which the precipitate is formed. The colloidally dispersed form is, in some cases, more reactive, in any event, however, it can be more conveniently dosaged than the difficultly soluble precipitate.

The formation of catalyst precipitates can be minimized or substantially overcome so as to yield primarily in the first instance substantially colloidally dispersed solutions if higher molecular Al-trihydrocarbon and preferably Al-alkyls are used. Thus if, instead of using a solution of aluminum triethyl in hexane, there is used a solution of a higher aluminum trialkyl which, for example, has approximately the average composition of an aluminum trioctyl, there is obtained a completely homogenous dark solution of the polymerization catalyst.

Polyethylenes obtained by use of the catalyst in accordance with the invention, as has been set forth above, have an extremely high molecular weight which may range up to 3,000,000 and more. These polyethylenes are believed to be completely novel and different from the solid polyethylene polymers previously obtained. These new polyethylenes have a softening point or melting point, which will be generically referred to herein as the softening point, of more than 130° C., and are insoluble in all solvents at room temperature.

The polyethylenes produced in accordance with the invention, having a molecular weight up to about 100,000 will in most solvents only partially dissolve at a temperature above about 70° C., while those having a molecular weight above 100,000 will only partially dissolve in such solvents at temperatures above about 100° C. The temperature stability or resistance of the new polyethylenes is greater than that of the known conventional polyethylenes. Upon heating the new products to temperatures above 250° C., they retain their white color, while the color of the known products changes to gray between 200 and 250° C. The resistance of the new polyethylenes to oxidation by atmospheric oxygen is also much greater.

The new polyethylenes in accordance with the invention have a high crystal content which is unusual for high molecular hydrocarbons. The degree of crystallization, as shown by X-ray diagrams, generally amounts to 80% and in many cases even higher. At times also lower values may occur. The crystallinity remains unchanged to a temperature of 100° C. or higher and disappears only near the softening point.

The new polyethylenes are almost completely linear in molecular structure and have practically no branch chains. In general, the percentage of the methyl groups is relatively small, being at most about 0.03% and in some cases even less than 0.01%. Infrared spectrographs of the new products in accordance with the invention do not show the characteristic methyl band of the prior known polyethylenes.

The tear strength of the new polyethylenes in accordance with the invention is a minimum of about 100 kilograms per square centimeter, and frequently more than about 200 kilograms per square centimeter. The tensile strength in undrawn condition is more than about 200 kilograms per square centimeter and in elongation-oriented films or sheets, up to about 3,000 kilograms per square centimeter.

The products may be worked directly, for example, between heated plates, into clear, transparent, elastic and flexible plates or sheets. The polyethylenes are also well suited for working in extrusion presses or for injection molding. In molten state they can be spun into threads by the methods usually employed for spinning superpolyamide threads. They may be cold drawn and may be drawn in this manner into ribbons, wires, or filaments of high elasticity and strength such as have never been obtained with prior known polyethylenes. Already in the working, the new polyethylenes show a remarkable tendency toward fiber formation. The threads produced from the new polyethylenes can be used as threads for industrial purposes. The new products can be spun to form filaments in the molten state by the methods which are conventional for the spinning of superpolyamide fibres such as nylon fibres. The filaments produced from the new polyethylenes can be employed as fibres for industrial purposes.

The following examples are given by way of illustration and not limitation, all operations involving the handling or obtaining of normally pyrophorous materials or of those tending to be pyrophorous and especially the catalyst combinations being carried out in an inert atmosphere such as $N_2$, as is conventional practice in the art.

EXAMPLE 1

20 cc. of aluminumtripropyl are carefully mixed with 0.2 gram titanium tetrachloride, which results in a very vigorous generation of heat. The solution becomes an opaque black, and is introduced under nitrogen into an autoclave of a volume of 500 cc. 60–70 grams of ethylene are forced into the autoclave which is then heated while shaking to 100° C. Within the course of 15 hours, the pressure drops to about 20 atm. The reaction mixture is allowed to cool and the excess ethylene is blown off. The content of the autoclave is in the form of a paste-like mass which consists of a mixture of high-molecular ethylene and low-molecular liquid and solid, soluble products. It is stirred with methyl alcohol, extracted with methyl-alcoholic hydrochloric acid and thereupon with acetone. There remains 30 grams of an insoluble residue of high melting point which consists of a snow-white, finely granular, powdered mass of polyethylene. The powdery mass is pressed between metal plates heated to 150° C. and thereafter rapidly cooled, thus, forming a film which is extremely elastic and can be torn only with the application of a very great force.

EXAMPLE 2

2 grams of titanium tetrachloride were added, drop by drop, with the exclusion of air, into 40 cc. of aluminum triethyl. A black precipitate formed with a vigorous production of heat. 200 cc. of hexane were added to the mixture, and a part of the dark substance which had formed precipitated and another portion remained in solution with a dark color in the hexane, presumably in colloidal solution. The hexane fraction was transferred into a 500 cc. autoclave which was filled with nitrogen and ethylene was introduced up to a pressure of 60 atmospheres. Upon shaking, the temperature increased spontaneously to 60° C. and the pressure dropped 25 atmospheres. The introduction of ethylene under pressure was repeated but another strong rise in tempeature was not noted. Nevertheless, the ethylene pressure receded again though more slowly. Ethylene was introduced under pressure a total of five times, a total of 88 grams of ethylene being introduced in this manner into the autoclave. After a total of 65 hours, it was possible to blow only 4 grams of ethylene out of the autoclave. The content of the autoclave consisted of a solid mass which could be crushed only with a difficulty and which had completely absorbed the solvent used. This mass was broken out of the autoclave in a suitable manner, introduced into methyl alcohol and thereupon heated with methyl-alcoholic hydrochloric acid. After filtration, washing with methyl alcohol and drying, 80 grams of a white difficultly soluble powder were obtained which was pressed between heated metal plates at 160–170° to form clear transparent sheets having extremely good mechanical properties. A narrow strip cut out of such a sheet was stretched in the cold to about 3–4 times its length, in which connection the characteristic phenomena known from the stretching of polyamide tapes was observed. The tear strength of the stretched tapes was as high as 30 kg./mm.$^2$.

EXAMPLE 3

Example 2 is repeated using as the polymerization exciter the black precipitate which settled upon dilution with hexane which was completely freed from dissolved portions of aluminum triethyl by repeated formation of a suspension with hexane, settling and pouring off of the solvent all with the exclusion of air. In all other respects the procedure and results are substantially the same as in Example 2.

EXAMPLE 4

500 cc. of liquid paraffin are deserated by the introduction of nitrogen and heating to 100° C. After cooling there are added 58 grams of an aluminum trialikyl of the average composition of aluminum tridodecyl, whereupon 2.6 grams titanium tetrachloride are admixed while stirring under nitrogen. The mixture becomes an opaque black. However, no solid precipitate settles out. Thereupon ethylene is introduced while stirring at room temperature. The temperature rises during the course of ½ hour by itself from 23 to 43° C. and the ethylene is vigorously absorbed at a rate of about 10 grams per hour. Soon after the beginning of the experiment it can be noted that A difficulty soluble substance separates out of the mixture. After about 3–4 hours, the absorption of ethylene decreases. There is then added, while stirring, 200 cc. hexane in order to dilute the reaction mixture and make it more easily stirrable, whereupon methyl alcohol is added. The reaction mixture at first still remains dark. Only upon suction filtering in contact with air does it change into a light olive green. This color is furthermore at first characteristic of the filtered precipitate. If the precipitate, after washing with methyl alcohol, is heated very slightly with about 5% nitric acid, it becomes pure white. It is then again filtered, washed with methyl alcohol and dried. There are obtained 40 grams of a pure white very loose powder which after pressing into sheets shows all the properties described for the product obtained in accordance with Example 2. The activity of the catalyst can be improved and more polyethylene obtained per gram of catalyst if the entire quantity of catalyst is not introduced at the beginning but the catalyst is rather added gradually drop by drop over a lengthy period of time. The same test can also be carried out with cooling of the reaction mixture to 20° C., particularly if a more readily moble solvent such as hexane is used instead of liquid paraffin. The reaction time is then of course increased.

EXAMPLE 5

Example 4 is repeated but the solution of the catalyst in the liquid paraffin is warmed to about 40–50° C. and then the gas mixture is passed through it. The said gas mixture contains about 10–20% ethylene as obtained by the thermal cracking of ethane. The course of the reaction is substantially the same as Example 4 but it takes about 10–12 hours before the same quantity of polymer is formed.

EXAMPLE 6

6 liters of hexane, 82 grams aluminum triethyl and 24 grams titanium tetrachloride are stirred with ethylene of a maximum pressure of 5 atm. in the apparatus described in the preceding example. The initial temperature is 25° C. The temperature rises by itself to 35° C. After a total of 12 hours, the reaction is interrupted. There is then present in the autoclave a thick paste which is worked up in the manner described in detail in Example 5. There is obtained about 1 kg. of a colorless, high-grade polyethylene which can be used directly as molding powder.

EXAMPLE 7

1 gram of solid zirconium acetylacetonate is carefully added to 40 cc. aluminum triethyl. The zirconium salt passes into solution with a yallok color and the color then changes after it has been standing for about 10 minutes via brown to black. 200 cc. of hexane are added to this mixture whereupon it is introduced, under nitrogen, in a 500 cc. autoclave of ordinary steel. A total of 110 grams ethylene is then introduced under pressure in about 4 portions. The addition of the ethylene is so regulated that the initial pressure after the heating to about 100° C. is 90–100 atm. The autoclave is then shaken at 100° C. Two to three hours after the introduction of ethylene in each case there is noticed a rapid decrease in the pressure down to 10–20 atm. After the introduction under pressure of a total of 110 grams ethylene, the ethylene absorption proceeds only slowly evidently due to the fact that the contents of the autoclave have solidified at this time into a mixture of solid polyethylene and hexane which is no longer mobile and therefore can no longer be brought actively enough into contact with the ethylene by shaking.

By using an autoclave which is provided with a strong agitator, this difficulty can be avoided and the absorption of the ethylene continued further. Small quantities (5 grams) of non-polymerized ethylene are thereupon drawn off and the autoclave opened. The content consists of a solid, swno-white mass dispersed with liquid which is stirred with methyl alcohol, suction filtered, heated with methyl-alcoholic hydrochloric acid in order to remove the metal compounds and then washed with methyl alcohol. No substantial quantities of soluble paraffin are extracted from the mass with boiling acetone. After drying at about 100° C., the polyethylene represents a snow-white, finely granular powdered mass which upon pressing between metal plates heated to 150° C. following by rapid cooling is converted into a clear and sometimes opaque film. This film is extremely elastic and can be torn only with the application of a very great force. The yield is practically quantitative.

EXAMPLE 8

In a 14 liter autoclave provided with an agitator, there are mixed, under nitrogen, 6 liters of benzene, 88 grams aluminum triethyl and 10 grams zirconium acetylacetonate. Thereupon heating is effected to 50° C. and ethylene is introduced up to a pressure of about 5 atm. The pressure is maintained at this level and stirring effected for 10 hours. The mixture is then allowed to cool; the unreacted ethylene is blown off and the autoclave opened. A colorless polymer has precipitated in an extremely peculiar form on the agitator as well as on the bottom of the autoclave. The polymer consists of a mass of slightly swollen filaments which somewhat resemble long-fibered asbestos. The mass can be very easily removed from the agitator, washed with benzene and dried.

EXAMPLE 9

20 cc. of aluminum triethyl are mixed with 20 cc. hexane and 2 grams thorium acetylacetonate are introduced into this mixture. The acetylacetonate passes into solution and the mixture assumes a light yellow color, and spontaneously heats up to near the boiling point of the hexane. At the same time gas is generated. The mixture is introduced, under nitrogen, into a 500 cc. autoclave and 180 cc. of distilled, air-free hexane are added. Thereupon 105 grams ethylene are introduced under pressure and the autoclave heated to 95° C. The pressure rises temporarily to about 150 atm. but starts to decrease again before the autoclave has reached the temperature of 95° C. The autoclave is shaken for 40 hours at 95° C. and allowed to cool, whereupon any excess pressure which is still present is released. 3 grams of gaseous constituents escape consisting principally of ethane which is normally admixed with the ethylene. The contents of the autoclave consists of a readily stirrable paste of a snow-white fibrous polyethylene suspended in hexane. The metal organic compounds are decomposed by the addition of methyl alcohol and suction filtered and the solid polyethylene is heated with methyl-alcoholic hydrochloric acid in order to eliminate the metal compounds. After the filtering, washing with methyl alcohol, and drying there are obtained 102 grams of the polyethylene. The polymer becomes soft at 145–150° C. and can be pressed between heated metal plates into clear sheets having extremely good mechanical properties.

EXAMPLE 10

Example 9 is repeated but 2 grams of uranium tetrachloride are used instead of the thorium compound. A polyethylene which has excellent properties is produced.

EXAMPLE 11

As in Examle 7, 20 cc. aluminum triethyl are mixed with 0.2 gram vanadin-III-acetyl-acetonate. This mixture is also black. The mixture is subjected to further treatment as described in Example 1, and produces 6 grams butene and 15 grams polyethylene with a high melting point, as well as about 35 grams liquid and semi-solid soluble products.

EXAMPLE 12

2 grams chromium acetyl-acetonate are added to 20 cc. aluminum triethyl with exclusion of air. Under heat the solution turns black, but there is no appreciable precipitation. The mixture is then diluted with 200 cc. hexane in a 500 cc. autoclave, whereupon a pressure of 70 atmospheres is produced with ethylene and the autoclave is shaken. The pressure drops rapidly to about 25 atmospheres because the solvent first absorbs the ethylene to saturation. More ethylene is added and the mixture shaken. The pressure now drops somewhat more slowly. This operation is repeated several times at increasingly long intervals. In the course of 24 hours 110 grams ethylene were introduced into the autoclave. The pressure at the end of the 24 hours was still 40 atmospheres. The temperature rose precipitately to 30° C. at the beginning of the experiment. After 24 hours 41 grams of unchanged ethylene were blown off, whereupon the autoclave was opened and the contents were immediately mixed with methyl alcohol. The contents of the autoclave now form a semi-solid mass which is washed out, sucked off and subsequently heated with methyl-alcoholic hydrochloric acid in order to remove the catalyst components, and again filtered. After drying, 69 grams of a colorless powder insoluble in all organic solvents were obtained which could easily be pressed into sheets between heated metal plates.

EXAMPLE 13

2.5 grams of tungsten hexachloride $WCl_6$ are added to 20 cc. aluminum triethyl and the mixture ground in 200 cc. hexane in a ball mill for 2 hours. The catalyst suspension is then introduced into a 500 cc. autoclave. Thereupon ethylene with a pressure of 160 atmospheres is allowed to act on the mixture at 100° C. for 24 hours. When the autoclave is opened about 10 grams of polyethylene products will be found.

EXAMPLE 14

Add to 20 cc. aluminum triethyl 0.2 gram molybdenum acetyl-acetonate. Then proceed as in Example 13 and after 24 hours at 100° C. and 85 atmospheres ethylene pressure about 5 grams polyethylene of the type described will be obtained.

EXAMPLE 15

To 20 cc. aluminum triethyl add 0.2 gram tantalum pentachloride $TaCl_5$ and treat the mixture in the manner described in connection with Examples 13 and 14. At 90° C. and 90 atmospheres ethylene pressure 6 to 8 grams polyethylene are obtained after 20 hours.

EXAMPLE 16

Add 4 grams zirconium tetrabromide to 20 cc. aluminum triethyl, grind the mixture for 3 hours in 200 cc. hexane in a ball mill and introduce the suspension into a 500 cc. autoclave. At 60° to 70° C. and 70 atmospheres ethylene pressure, 122 grams polyethylene are obtained after 24 hours.

EXAMPLE 17

Introduce a mixture of 25 cc. aluminum triethyl and 0.5 gram $K_2TiF_6$ into 200 cc. hexane in a ball mill. Grind for 3 hours. Bring the mixture into a 500 cc. autoclave as indicated in Example 16. After 10 hours reaction at 100° C. and 60 to 70 atmospheres ethylene pressure 45 grams of polyethylene are obtained.

EXAMPLE 18

Titanium hydrated oxide produced by careful hydrolysis of 5 grams titanium tetrachloride at 0° to −10° C., after being filtered and washed with ice water is shaken three time with 100 cc. acetone, once with 100 cc. ether and three times with petroleum ether, at 0° C. and completely dried after being subjected to suction for 1 hour. 0.4 gram of the titanium compound thus treated are suspended in 100 cc. hexane and mixed with 20 cc. aluminum triethyl introduced drop by drop at 0° C. under nitrogen. The suspension is then introduced into a ball mill under nitrogen and ground for 3 hours. The suspension is then filled into a 500 cc. autoclave under nitrogen. Under the conditions indicated in Example 17, 35 grams of polyethylene are obtained.

EXAMPLE 19

The zirconium, precipitated as hydrated oxide from an aqueous solution of zirconium nitrate by adding ammonia drop by drop at 0° C., is filtered, washed and dried as described in Example 18. 3 grams of zirconium hydrated oxide dried in the manner above indicated are added to 50 cc. aluminum trioctyl and this mixture is ground in 200 cc. hexane in a ball mill for 2 to 3 hours. Under the conditions indicated in Example 18, 55 grams polyethylene are obtained with the aid of a catalyst.

EXAMPLE 20

250 millimoles aluminum triisobutyl are dissolved in 250 cc. Diesel oil and 25 millimoles zirconium tetrabutylate added. Stirring intensively, the mixture is heated for 5 hours at 100° C. The catalyst mixture is diluted with 1500 cc. diesel oil and ethylene introduced at 55° C. for 6 hours. 10 grams polyethylene are formed.

EXAMPLE 21

50 cc. of a 0.5 molecular solution of aluminum triisobutyl in diesel oil are dissolved in 100 cc. diesel oil and 50 cc. of a 0.5 molecular solution of titanium tetrachloride in diesel oil added drop by drop. The mixture is then stirred for 10 minutes at room temperature, diluted with 2.3 liters of diesel oil and ethylene introduced at 60° C. After 1 hour polymerzation at 60° to 70° C., 230 grams of polyethylene are obtained.

EXAMPLE 22

2.1 grams of titanium tetrachloride (1.2 cc.)=11.4 millimols were added to a suspension of 11.7 gm. of aluminum triphenyl=45.6 millimols in 500 cc. of Aliphatin. The white aluminum triphenyl suspension turned brown immediately on the addition of titanium tetrachloride. After shaking overnight in an oscillating ball mill only approximately 15% of the chlorine bound to titanium were still to be found in the centrifuged solution.

The whole suspension was boiled with 500 cc. of Aliphatin and introduced into a 5-liter stirring autoclave. Ethylene was pumped in to a pressure of 20 atmospheres and the autoclave was slowly heated. During heating up the pressure rose slowly and thereafter fell between 30 and 40° C. to 16 atmospheres. The pressure was again restored to 20 atmospheres by once more pumping in ethylene and then fell only slowly in the course of a day to 13 atmospheres. After blowing off unreacted ethylene, the autoclave was opened. The reaction mixture was black and pasty. After separating the Aliphatin by sectional filtration, boiling with methaonlic hydrochloric acid and filtering with suction drying, 85 gm. of a gray polyethylene were obtained. A total of approximately 150 gm. of ethylene had been introduced.

Zirconium tetrachloride, zirconium-IV-acetylacetonate thorium acetylacetonate, uranium hexachloride or chromium-III-acetylacetonate, using molar equilavent amounts under otherwise the same reaction conditions, can be employed instead of titanium tetrachloride to obtain a high molecular polyethylene. Similarly Al-tritelyl, Al-trixylyl and Al-trinaphthyl, using molar equivalent amounts under otherwise the same reaction conditions, when substituted in this example for the tri-phenyl aluminum compound will give similar results in combination with any of the heavy metal compounds herein specified.

EXAMPLE 23

A suspension of 7 gm. of sodium phenyl in 100 cc. of benzol was mixed with 5 gm. of diethyl aluminum chloride introduced drop by drop with vigorous stirring. After a period of reaction of 1 hour, the sediment was centrifuged off and the benzol solution freed from benzol by evaporation in a vacuum. The residue contained no chlorine and its analysis showed a compound having the formula $$H_5C_6Al(C_2H_5)_2$$

4 gm. of the phenyl aluminum diethyl thus produced were ground in an oscillating ball mill for 2 hours with 4 gm. of zirconium chloride and 200 cc. of hexane, whereupon the brownish black suspension was introduced into 500 cc. autoclave and 75 gm. of ethylene were pumped in. The autoclave was then shaken for 35 hours at a temperature of 90 to 100° C. During this period the pressure had fallen to 30 atmospheres. After cooling, 10 gm. of ethylene were blown off. The autoclave contained 62 gm. of asbestos-like polyethylene. For purification purposes, the polyethylene, was separated by filtration from the solvent and boiled with methanolic hydrochloric acid, which dissolved the catalyst residue contained in the polyethylene. The product was thereafter washed with methanol and acetone to remove any hydrochloric acid still adhering. In this way a substantially pure white product was obtained.

By way of further exemplification of the benefits obtainable by selection of mol ratios within the sensitive range of a given catalyst combination, useful in accordance with the invention, the examples set forth in the following Tables II to VII (FIGS. 2-7) are furnished:

Table II shows the results of experiments obtained when using an aluminum tridecyl and titanium tetrachloride system. In this case, the "steep" range of the molecular ratio between aluminum tridecyl and titanium tetrachloride is between 0.5:1 and 2:1. These results are also illustrated by curve B in FIG. 2 of the accompanying drawings.

TABLE II

| No. of experiment | Molecular ratio $Al(C_{10}H_{21})_3$: $TiCl_4$ | Colour of catalyst | Yield after 50 minutes reaction, g. polyethylene | $(\eta)$ dl./g. | Average molecular weight of the polyethylene |
|---|---|---|---|---|---|
| 1 | 5.6 | Black | 178 | 6.60 | 258,000 |
| 2 | 4 | ...do | 193 | 7.68 | 310,000 |
| 3 | 2 | ...do | 262 | 8.12 | 330,000 |
| 4 | 1.5 | ...do | 213 | 7.45 | 298,000 |
| 5 | 1 | ...do | 177 | 4.75 | 170,000 |
| 6 | 0.5 | Blackish-brown | 250 | 1.03 | 26,000 |

Table III shows the ratios in an aluminum triisobutyl and titanium tetrachloride system. In this case, the molecular weight of the polyethylene can be closely influenced by regulating the molecular ratio of aluminum triisobutyl to titanium tetrachloride between 0.5:1 and 3:1. The results of this experiment are particularly pronouced, since in this case the molecular weight of the polyethylene can be regulated between about 50,000 and about 1,090,000. FIG. 3 of the accompanying drawings shows the extraordinarily steep portion $c'$ of the curve C in the sensitive range portion between 0.5:1 and 3:1.

TABLE III

| No. of experiment | Molecular ratio $Al(1-C_4H_9)_3$: $TiCl_4$ | Colour of catalyst | Yield after 50 minutes reaction, g. polyethylene | $(\eta)$ dl./g. | Average molecular weight of the polyethylene |
|---|---|---|---|---|---|
| 1 | 0.5 | Black | 281 | 1.97 | 50,000 |
| 2 | 0.9 | ...do | 303 | 4.15 | 145,000 |
| 3 | 0.98 | ...do | 211 | 6.4 | 250,000 |
| 4 | 1 | ...do | 230 | 7.45 | 300,000 |
| 5 | 1.5 | ...do | 280 | 11.56 | 510,000 |
| 6 | 2 | ...do | 281 | 13.3 | 600,000 |
| 7 | 2 | ...do | 316 | 13.57 | 620,000 |
| 8 | 3 | ...do | 152 | 21.25 | 1,090,000 |
| 9 | 4 | ...do | 195 | 20.2 | 1,030,000 |
| 10 | 6 | ...do | 110 | 19.2 | 960,000 |
| 11 | 6 | ...do | 56 | 20.2 | 1,030,000 |

As will be seen from Table III and FIG. 3 molecular weights of an especially high order of magnitude are obtained when using branched alkyl radicals attached to the aluminum.

Table IV illustrates the results of experiments obtained when using an aluminum propyl and titanium tetrachloride system. As shown in this table the "steep" range of the molecular weight/mol ratio values lies between mol ratios of 0.4:1 and 1:1. In this case the entire sensitive range extends to in excess of 6:1. When costs of material are not necessarily a critical impediment it is in some cases desirable to operate within a less steeply increasing molecular weight portion of the mol ratio range. This is well illustrated by curve D (FIG. 4) which is plotted on the values of Table IV and shows the "steep" portion C and the less steeply inclining section $e$. Thus, when the primary consideration is the selection of a specific molecular weight which is reasonably accurately reproduceable, curve section $e$ will permit a greater latitude of error or deviation in mol ratio without appreciably affecting the desired molecular weight.

TABLE IV

| No. of experiment | Averacular ratio Al($C_3H_7$)$_3$: $TiCl_4$ | Colour of catalyst | Yield hour reaction g. polyethylene | $(\eta)$ dl./g. | Average molecular weight of the polyethylene |
|---|---|---|---|---|---|
| 1 | 0.4 | Brown | 432 | 1.75 | 50,000 |
| 2 | 0.5 | do | 502 | 2.12 | 63,000 |
| 3 | 0.7 | do | 415 | 3.0 | 95,000 |
| 4 | 1 | Brownish-black. | 321 | 7.67 | 310,000 |
| 5 | 2 | Blackish-brown. | 290 | 9.40 | 395,000 |
| 6 | 4 | Black | 179 | 10.12 | 434,000 |
| 7 | 6 | do | 162 | 10.72 | 465,000 |

Table V shows the results of experiments obtained when using an aluminum triethyl titanium chloride system. The "steep" range of molecular weights in relation to mol ratio extends in this case between 0.4:1 and 1:1. The results of the values are illustrated by curve E (FIG. 5). In this case the "steep" section "$c_{111}$" is followed as part of the sensitive range by a more gradually inclining curve section $e$, which permits the obtaining of a specific molecular weight in the range from about 245,000 to in excess of 310,000 without running the risk of appreciable deviation in the event of relatively small changes in the mol ratio selected to produce the desired molecular weight.

TABLE V

| FN No. of experiment | Molecular ratio Al($C_2H_5$)$_3$: $TiCl_4$ | Colour of catalyst | Yield after 1 hour reaction, g. polyethylene | $(\eta)$ dl./g. | Average molecular weight of the polyethylene |
|---|---|---|---|---|---|
| 1 | 0.4 | Brown | 310 | 1.41 | 38,000 |
| 2 | 0.5 | do | 308 | 1.92 | 55,000 |
| 3 | 0.8 | Dark-brown | 311 | 2.80 | 90,000 |
| 4 | 1 | do | 327 | 5.82 | 220,000 |
| 5 | 2 | Brownish-blzck. | 340 | 6.35 | 245,000 |
| 6 | 3 | do | 353 | 6.72 | 260,000 |
| 7 | 7 | Blac | 224 | 7.70 | 310,000 |

Table VI shows a few limiting experiments ("steep portion") for additional organic aluminum compounds and heavy metal compounds. With the experiments using zirconium compounds and chromium compounds, in each case 12.3 g. of zirconium acetyl acetonate or 9.0 g. of chromium acetyl acetonate were used. These results are illustrated by graphs F and D in FIG. 6. The amount of $TiCl_4$ was 4.75 g.

TABLE VI

| Graph | No. of experiment | Molecular ratio | Colour of catalyst | Reaction time | Yield, g. of polyethylene | $(\eta)$ dl/g. | Average molecular weight of polyethylene |
|---|---|---|---|---|---|---|---|
| 1F | 1 | ¹6 | Reddish brown. | 4 | 6.2 | 8.17 | 330,000 |
|  | 2 | ¹8 | do | 4 | 20 | 15.4 | 730,000 |
| G | 3 | ²8 | Blackish brown. | 2 | 16 | 2.86 | 90,000 |
|  | 4 | ²12 | do | 2 | 5 | 7.0 | 276,000 |

¹ Al(i$C_4H_9$)$_3$ : Zr($C_5H_7O_2$)$_4$.
² Al(i$C_4H_9$)$_3$ : Cr($C_5H_7O_2$)$_3$.

Table VII shows the results of experiments when using an aluminum triphenyl-titanium chloride system. The "steep" range of molecular weights in relation to mol ratio extends in this case between 0.5:1 and 1:1. The results of the values are illustrated by curve H (FIG. 7). In this case the "steep" section $c_{111}$ is followed as part of the sensitive range by a more gradually inclining curve section $e$ which permits the obtaining of a specific molecular weight in the range from about 370,000 to 560,000.

TABLE VII

| FN No. of experiment | Molecular ratio Al($C_6H_5$)$_3$: $TiCl_4$ | Yield after 1 hour reaction, g. polyethylene | $(\eta)$ dl./g. | Average molecular weight of the polymer |
|---|---|---|---|---|
| 1 | 0.5 | 1.6 | 0.81 | 19,000 |
| 2 | 1 | 2.8 | 8.9 | 370,000 |
| 3 | 2 | 92 | 12.5 | 560,000 |
| 4 | 4 | 4 | 11.3 | 500,000 |

When varying mol ratios of any of the aluminum alkyl or- aryl/heavy metal compound combinations, represented by the various examples herein, and repeating in each case a sufficient number of different mol ratio runs under otherwise substantially identical conditions, curves or graphs may be plotted from these resulting values showing sensitive ranges similar to those identified by FIGS. 1–7.

The effective or most effective utilization of the sensitive range of various catalyst combinations applicable in accordance with the invention makes it in most cases desirable to use a relatively pure initial monomer. As above pointed out, if for instance ethylene contains certain impurities, these may inactivate portions of the heavy metal compound, and/or the aluminum tri-hydrocarbon present in the solution and may thus undesirably shift the mol ratio initially present between the catalyst components. These difficulties, however, may be avoided if the ethylene or the gas mixture containing ethylene is preliminarily contacted or washed with organic metal compounds, preferably organic compounds of aluminum, before entering the reaction vessel in which it is to be contacted with the herein described catalyst material. When proceeding in this manner, the polymerization of the ethylene is actually carried out in two separate steps.

The organic metal compound useable in the first step of the just described two-step procedure is preferably one corresponding to the general formula RAlXY or RMeY in which R is hydrogen or a hydrocarbon radical, X is R or OR', Y is R, or OR', R' is a hydrocarbon radical and Me is a bivalent metal, preferably magnesium or zinc.

We claim:
1. Polymerization catalyst comprising the product formed by mixing an effective amount of an aluminum triaryl or aralkyl with a compound of a metal selected from the group consisting of salts, freshly precipitated oxides and hydroxides of metals of Groups IV–B, V–B and VI–B of the Periodic System, including thorium and uranium.
2. Polymerization catalyst according to claim 1 in which the aluminum compound is aluminum triaryl.
3. Polymerization catalyst according to claim 2 in which the aluminum compound is triphenyl.
4. Polymerization catalyst according to claim 1 in which the aluminum compound is an aluminum alkyl phenyl.
5. Polymerization catalyst according to claim 1 in which said catalyst is formed by mixing $2n$ to $3n$ mols of said aluminum triaryl or aralkyl per mol of said compound of said metal selected from the latter mentioned group $n$ representing the valency of said group member.
6. Polymerization catalyst according to claim 1 including an organic liquid being inert with respect to, and substantially a solvent for, the aluminum compound and other metal compound.
7. Polymerization catalyst according to claim 1 in which said compound of a metal is a halide.
8. Polymerization catalyst according to claim 7 in which said halide is a chloride.
9. Polymerization catalyst according to claim 8 in which said chloride is a titanium chloride.
10. Polymerization catalyst according to claim 9 in which said chloride is titanium tetrachloride.
11. Polymerization catalyst according to claim 1 in which said metal compound is an acetyl acetonate.
12. Polymerization catalyst according to claim 11 in which said acetonate is zirconium acetyl acetonate.
13. Polymerization catalyst according to claim 1 in which the aluminum compound is aluminum triaryl and in which the compound of a metal selected from said latter mentioned group is a halide.
14. Polymerization catalyst according to claim 13 in which said halide is a chloride.
15. Polymerization catalyst according to claim 1 in which the aluminum compound is an aluminum triaryl having substantially no aromatic rings exceeding $C_{10}$.
16. Polymerization catalyst according to claim 1 in which said catalyst is formed to represent the mol ratio of aluminum triaryl or aralkyl compound of a metal of said latter mentioned group within the range of mol ratios defined by the mol ratio versus molecular weight curve for which the molecular weights are those of a polyolefin obtained by olefin polymerization with said catalyst.
17. Polymerization catalyst according to claim 16 in which said catalyst is formed to represent a mol ratio within the sensitive range of said curve.
18. Polymerization catalyst according to claim 17 in which said catalyst is formed to represent a mol ratio within the steep portion of said curve.
19. Polymerization catalyst according to claim 18 in which said polyolefin is polyethylene.
20. Polymerization catalyst which comprises a solvent distributed catalyst formed by mixing aluminum triaryl with a heavy metal compound while at least one thereof is in solution in an organic solvent substantially inert with respect to said aluminum triaryl and said heavy metal compound, the heavy metal of the latter being selected from the group consisting of titanium, zirconium, hafnium, thorium, uranium, vanadium, niobium, tantalum, chromium, molybdenum and tungsten, said aluminum triaryl having substantially no aromatic rings exceeding $C_{10}$ and there being present a mol ratio of aluminum triaryl heavy metal compound within the sensitive range of mol ratios defined by a mol ratio versus molecular weight curve, for which the moleclular weights are those of a polyolefin produced by polymerization of an olefin with said catalyst.
21. Polymerization catalyst according to claim 20 in which said aluminum triaryl is an aluminum triphenyl.
22. Polymerization catalyst according to claim 21 in which said heavy metal compound is a halide.
23. Polymerization catalyst according to claim 20 in which the heavy metal compound is an acetyl acetonate.

References Cited
UNITED STATES PATENTS

| | | | |
|---|---|---|---|
| 2,721,189 | 10/1955 | Anderson et al. | 252—431X |
| 3,257,332 | 6/1966 | Ziegler et al. | 252—431X |
| 2,910,461 | 10/1959 | Nowlin et al. | 252—429(A)X |
| 2,912,421 | 11/1959 | Juveland et al. | 252—429(A)X |
| 2,918,459 | 12/1959 | Nowlin et al. | 252—429(A)X |
| 2,935,501 | 5/1960 | Weber et al. | 252—429(A)X |
| 3,008,948 | 11/1961 | Stampa et al. | 252—429(A)X |
| 3,041,325 | 6/1962 | Farnham | 252—429(A)X |
| 3,050,471 | 8/1962 | Anderson et al. | 252—429(A) |
| 3,065,220 | 11/1962 | McManimie et al. | 252—429(A)X |
| 3,114,743 | 12/1963 | Horne | 252—429(A)X |

FOREIGN PATENTS

| | | | |
|---|---|---|---|
| 874,215 | 4/1953 | Germany | 252—429(A) |

OTHER REFERENCES

Hall et al.: J. Inst. Petrol. Tech., 1937, vol. 23, pp. 679–687.

PATRICK P. GARVIN, Primary Examiner

PO-1050
(5/69)

UNITED STATES PATENT OFFICE
CERTIFICATE OF CORRECTION

Patent No. 3,574,138      Dated April 6, 1971

Inventor(s) 1) Karl Ziegler   2) Heinz Breil   3) Erhard Holzka
4) Heinz Martin

It is certified that error appears in the above-identified pate and that said Letters Patent are hereby corrected as shown below:

Column 3, line 49

"halogene" should be --halogeno--

Column 6, line 13

"the" (second occurrence) should be --for--

Column 9, line 19

"he" should be --the--

Column 11, line 71

"deserated" should be --deaerated--

Column 13, line 6

"swno" should be --snow--

Column 15, line 58

"methaonlic" should be --methanolic--

Column 17, line 40    Table IV, first word of 2nd column headi

"averacular" should be --molecular--

Column 17, line 40    Third column heading, Table IV:

"yield hour reaction" should be --yield after 1 hour re

Signed and sealed this 28th day of December 1971.

(SEAL)
Attest: